(12) United States Patent
Cappelletti (10) Patent No.: US 7,499,155 B2
(45) Date of Patent: Mar. 3, 2009

(54) LOCAL POSITIONING NAVIGATION SYSTEM

(76) Inventor: Bryan Cappelletti, 213 Lamplight Ct., O'Fallon, IL (US) 62269

( * ) Notice: Subject to any disclaimer, the term of this patent is extended or adjusted under 35 U.S.C. 154(b) by 0 days.

(21) Appl. No.: 11/508,472

(22) Filed: Aug. 23, 2006

(65) Prior Publication Data

US 2008/0049217 A1    Feb. 28, 2008

(51) Int. Cl.
*G01C 1/00* (2006.01)
(52) U.S. Cl. .................................. 356/141.3
(58) Field of Classification Search ....... 356/3.01–3.15, 356/4.01–4.1, 5.01–5.15, 6–22, 141.1–141.5
See application file for complete search history.

(56) References Cited

U.S. PATENT DOCUMENTS

| | | | |
|---|---|---|---|
| 3,924,389 A | 12/1975 | Kita | |
| 5,897,156 A * | 4/1999 | Hayard et al. | ......... 296/136.13 |
| 5,911,670 A | 6/1999 | Angott et al. | |
| 5,974,347 A | 10/1999 | Nelson | |
| 6,459,955 B1 | 10/2002 | Bartsch et al. | |
| 6,580,268 B2 * | 6/2003 | Wolodko | .................... 324/240 |
| 6,611,738 B2 * | 8/2003 | Ruffner | ....................... 701/23 |
| 2007/0058161 A1 * | 3/2007 | Nichols et al. | ......... 356/139.01 |

* cited by examiner

*Primary Examiner*—Thomas H Tarcza
*Assistant Examiner*—Luke D Ratcliffe
(74) *Attorney, Agent, or Firm*—Wenzel & Harms, P.C.; Allan L. Harms (57) ABSTRACT

A local positioning navigation system and method for controlling navigation are provided. The local positioning navigation includes a stationary unit having a pointing device configured to emit a light signal and a roving unit having a detector including a plurality of light detecting elements configured to detect the emitted light signal from the stationary unit. The local positioning system further includes a controller configured to receive navigation information from the roving unit based on the detected emitted light signal and to provide control commands to the stationary unit to move the pointing device to direct the emitted light signal based on the navigation information.

23 Claims, 5 Drawing Sheets

LOCAL POSITIONING NAVIGATION SYSTEM

BACKGROUND OF THE INVENTION

This invention relates generally to navigation systems, and more particularly, to a system providing navigation of a motorized device.

It is currently common practice for people to pay a lawn service to mow their yard. The mowing service is typically performed once a week and can be costly. Otherwise, individuals often spend several hours mowing their yard each weekend. This takes away from leisure time or time with family.

Lawn mowers are known to help reduce the human effort required to mow a yard or lawn. These powered devices automate the physical component of separating taller grass from shorter grass, namely, providing a powered blade to cut grass. It is also known to provide automatic lawn maintenance. For example, a mowing area may be defined and bounded by electronic markers, for example, transceivers that provide radio signals to guide a mower. Navigation systems for mowers that utilize Global Positioning System (GPS) navigation are also known. The mower in these systems may include an antenna or similar device to transmit and receive signals. Other navigation control systems are also known, for example, based on the time of movement of the mower or incremental counting of wheel rotation.

However, these known navigation systems for mowers are often expensive and may require substantial time in setup. Further, these systems can be complex to operate.

BRIEF DESCRIPTION OF THE INVENTION

In one embodiment, a local positioning system is provided that includes a stationary unit having a pointing device configured to emit a light signal and a roving unit having a detector including a plurality of light detecting elements configured to detect the emitted light signal from the stationary unit. The local positioning system further includes a controller configured to receive navigation information from the roving unit based on the detected emitted light signal and to provide control commands to the stationary unit to move the pointing device to direct the emitted light signal based on the navigation information. Thus, in essence, a closed feedback loop is created as described in more detail herein.

In another embodiment, a local positioning system is provided that includes a stationary unit having a pointing device including a hall effect magnetic sensor and connected to one end of string doped with a magnetic material and a roving unit having a detector including a pressure transducer and connected to another end of the string and configured to detect movement of the string. The local positioning system further includes a controller configured to receive angle information based on movement of the hall effect magnetic sensor and distance information based on movement of the string and to provide control commands to the stationary unit to move the pointing device based on the angle and distance information.

In yet another embodiment, a local positioning system is provided that includes a plurality of units each having a pointing device configured to emit a light signal and a detector including a plurality of light detecting elements configured to detect the emitted light signal from another unit. The local positioning system further includes a plurality of docking stations configured to receive one of the plurality of units. The local positioning system also includes a controller configured to receive navigation information from one of the plurality of units that is stationary and, based on an emitted light signal detected by a moving one of the plurality of units, provide control commands to the stationary unit to move the pointing device of the stationary unit to direct the emitted light signal based on the navigation information to control movement of the moving unit.

DETAILED DESCRIPTION OF THE INVENTION

Various embodiments of the invention include a system that provides automatic guidance or navigation of a motorized device, for example, a lawn mower. However, the various embodiments are not limited to lawn mowers and may provide automatic guidance of other motorized devices including, but not limited to, forklift navigation, such as in a warehouse environment, navigation of a device in an ice rink, etc.

In general the various embodiments provide a localized navigation system that provides mapping of a three-dimensional surface. For example, the various embodiments provide navigation of a motorized device based on pattern repetition. In general, a mapped surface is stored and retrieved as needed such that a pattern may be repeated for navigating the motorized device on a localized surface of a three-dimensional (3D) object (most typically the Earth). More particularly, the various embodiments provide a navigation process based on a repetitive or predetermined pattern on the surface of a 3D object and location detection of the roving object based on a fixed stationary object using a closed feedback loop.

Figure 1:
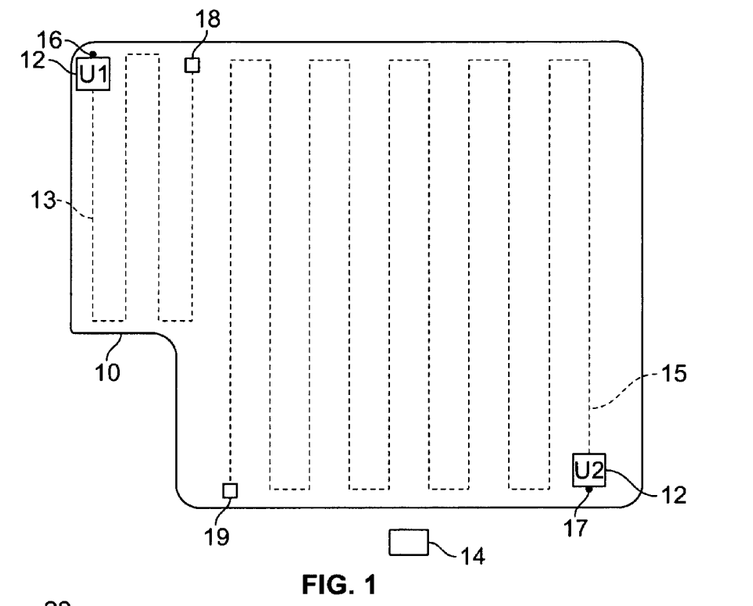
FIG. 1 is a diagram of a local positioning system constructed in accordance with an embodiment of the invention operating with plurality of units.

Specifically, a process for providing navigation of an area 10, for example, the boundary of a yard. It should be noted that the area 10 may be symmetrical in shape or may be non-symmetrical in shape. The various embodiments provide for navigating one or more units 12 (e.g., lawn mowing or grass cutting device) using a local controller 14 (e.g., personal computer) as described in more detail herein. The units 12 are initially moved (e.g., manually walked) along one or more paths to define a predetermined or preprogrammed path for navigation. For example, and referring to unit (U1) 12, this unit 12 is moved from a starting point 16 along a path 13 to an ending point defined by, for example, a docking station 18, which may be, for example, a pressure sensor or contact switch. The same process is performed for the unit (U2) 12 that is moved from a starting point 17 to a docking station 19 along a path 15. The docking stations 18 and 19 nullify perturbations in the navigation system. At any given time, one of the units 12 will be roving and the other unit 12 will be docked.

Information regarding the location of the starting points 16 and 17, the paths 13 and 15 and the docking stations 18 and 19 (e.g., nothing more than a contact switch) are communicated to and stored by the controller 14 while the either unit U1 12 or unit U2 12 is moved. Thereafter, the movement of the unit U1 12 can be controlled by the controller 14 using the stored information a local navigation system as described below. In general, one of the units, for example unit U1 12 operates as a roving unit when moving and the other unit U2 12 that is at a docking station operates as a stationary unit to provide location and navigation information as described below. Also, the vice versa may be provided with unit U1 12 operating as the stationary unit and the other unit U2 12 becomes the roving unit. Accordingly, during operation, one of the units 12 is stationary unit and one of the units 12 is a roving unit. Thus, each unit 12 is configured to operate as either a stationary unit or a roving unit, but not at the same time. Essentially, the two units 12 do not move within the same area at the same time. For example, one unit 12 is stationary and docked while the other unit 12 is moving, and vice versa.

Figure 2:
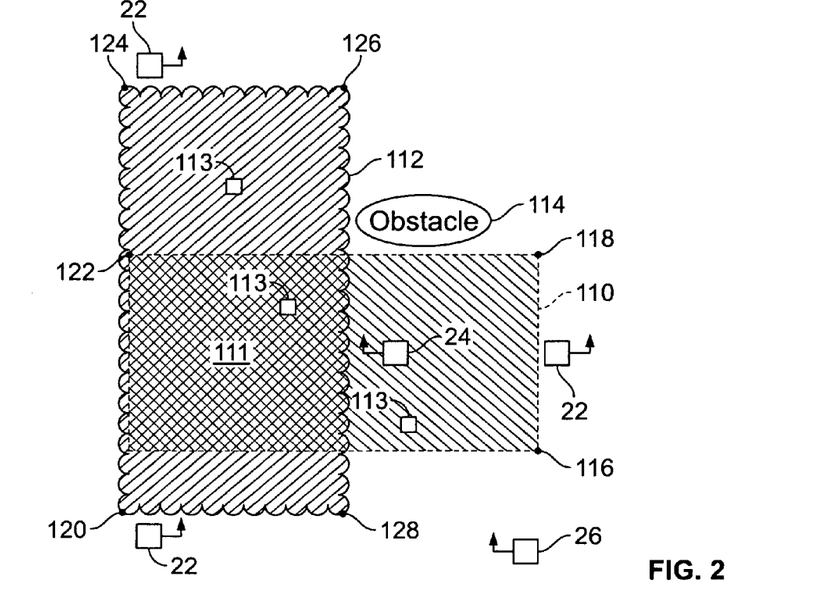
FIG. 2 is a diagram of a local positioning system constructed in accordance with an embodiment of the invention operating within a plurality of areas.

It should be noted that additional units 12 may be provided as desired or needed, for example, based on the shape, configuration or size of the area 10. Further, additional docking stations may be provided as desired or needed. Accordingly, other navigation and local positioning embodiments are described below. For example, as shown in FIG. 2, using defined paths, navigation of, for example, a lawn mower may be provided. More particularly, a first area 110 and a second area 112 (each represented by diagonal lines in opposite directions) may be defined and include an overlapping area 111 (represented by the portions of the diagonal lines that cross each other). In this embodiment, the system includes one or more units configured as dedicated units, and more particularly, as separate roving and stationary units. Specifically, the first and second areas 110 and 112 are set such that a roving unit 24 travels within the first and second areas 110 and 112 and avoids an obstacle 114 (e.g., a tree in a yard). It should be noted that in this embodiment, multiple stationary units 22 are provided. However, when only one stationary unit 22 is provided, the roving unit 24 is never out of direct line of sight of the stationary unit 22, that is, a simple pattern is adhered to such that there is no fixed obstacle between the roving unit 24 and the stationary unit 22. These simple patterns then can be used to construct more complicated patterns, for example, that or a typical lawn yard surrounding a residence.

In operation, the roving unit 24 is first moved within the perimeters of the first and second areas 110 and 112 to define an area with boundaries for the navigation of the roving unit 24. For example, the roving unit is moved (e.g., manually pushed) from point 116 to point 118, then to point 122 and point 120 using a pattern, for example, a repetitive back and forth pattern as shown in FIG. 1. This defines the entire first area 110. For example, the roving unit 24 also may be moved back and forth either transversely or longitudinally within the first area 110 over the entire first area 110. The location of the roving device 24 along the path defined within the first area 110 are stored within the memory 44 of the controller 26 (shown in FIG. 1). Thereafter, the same process is performed for the second area 112 from point 120 to point 124, then to point 126 and 128. When mapping the second area 112, any overlapping coordinate points may not be stored. One or more docking stations 113 also may be provided. Using the defined paths for the first and second areas 110 and 112, and the position of the roving unit 24 as determined by wirelessly communicated navigation information and the docking stations 113, a controller 26 controls the movement and navigation of the roving unit 24 within the first and second areas 110 and 112 using one or more stationary units 22 as described below. By using such a pattern repetition process where one unit moves relative to a stationary unit and docks at a known location, and then the stationary unit becomes a roving unit relative to the newly docked and now stationary unit, fixed obstacles such as trees, bushes, posts, containers, etc. can be avoided.

Figure 3:
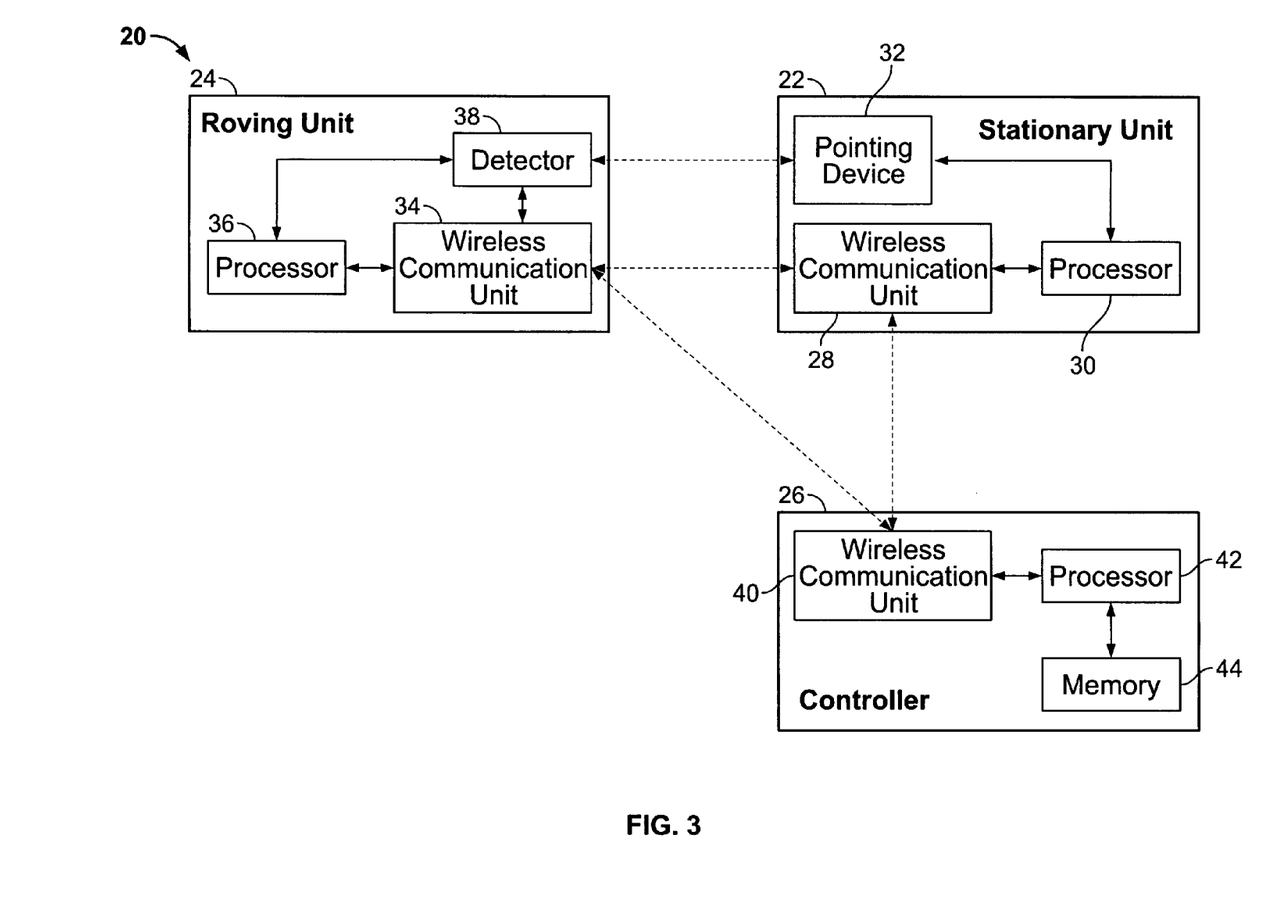
FIG. 3 is a block diagram of a local positioning system constructed in accordance with an embodiment of the invention.

Specifically, in various embodiments, a local positioning system 20 is provided as shown in FIG. 3. The local positioning system includes a stationary unit 22, a roving unit 24 (e.g., lawn mowing or grass cutting device) and a controller 26. The stationary unit 22 includes a wireless communication unit 28 connected to a processor 30, with the processor also connected to a pointing device 32. The roving unit 24 also includes a wireless communication unit 34 connected to a processor 36 and a detector 38. The processor 36 is also connected to the detector 38. The controller 26 also includes a wireless communication unit 40 connected to a processor 42. The processor 42 is connected to a memory 44 that may be separate from or integrated with the processor (e.g., a computer having a memory).

In operation the controller 26 communicates with the roving unit 24 via the wireless communication unit 40 of the controller 26. The wireless communication unit 34 of the roving unit 24 receives information informing the roving unit 24 to move. The roving unit 24 then provides feedback information via the wireless communication unit 34 to the controller 26. Based on this information the controller 26 communicates via the wireless communication unit 40 to the wireless communication unit 28 of the stationary unit 22 informing the stationary unit 22 where to point the pointing device 32. The stationary unit 22 then, optionally, provides feedback information via the wireless communication unit 28 to the controller 26. Based on such a feedback mechanism the controller 26 then computes the roving unit 24 position relative to the stationary unit 22. The process then repeats with the controller 26 informing, via the wireless communication unit 40, the roving unit 24 where to move/control its motorized wheels. It should be noted that the stationary unit 22 and roving unit 24 may be identical in nature, that is, both may have a pointing device and both may have location (e.g., light detecting) devices. Unit 12 in FIG. 1 is such an example. To restate again, essentially, the controller 26 communicates with the roving unit 24 and receives feedback information from the roving unit 24. Thereafter, the controller 26 communicates navigation control information to the stationary unit 22 based on the received feedback information. Based on such a feedback mechanism, location of the stationary and roving units are created, maintained, and repeated at will.

Figure 4:
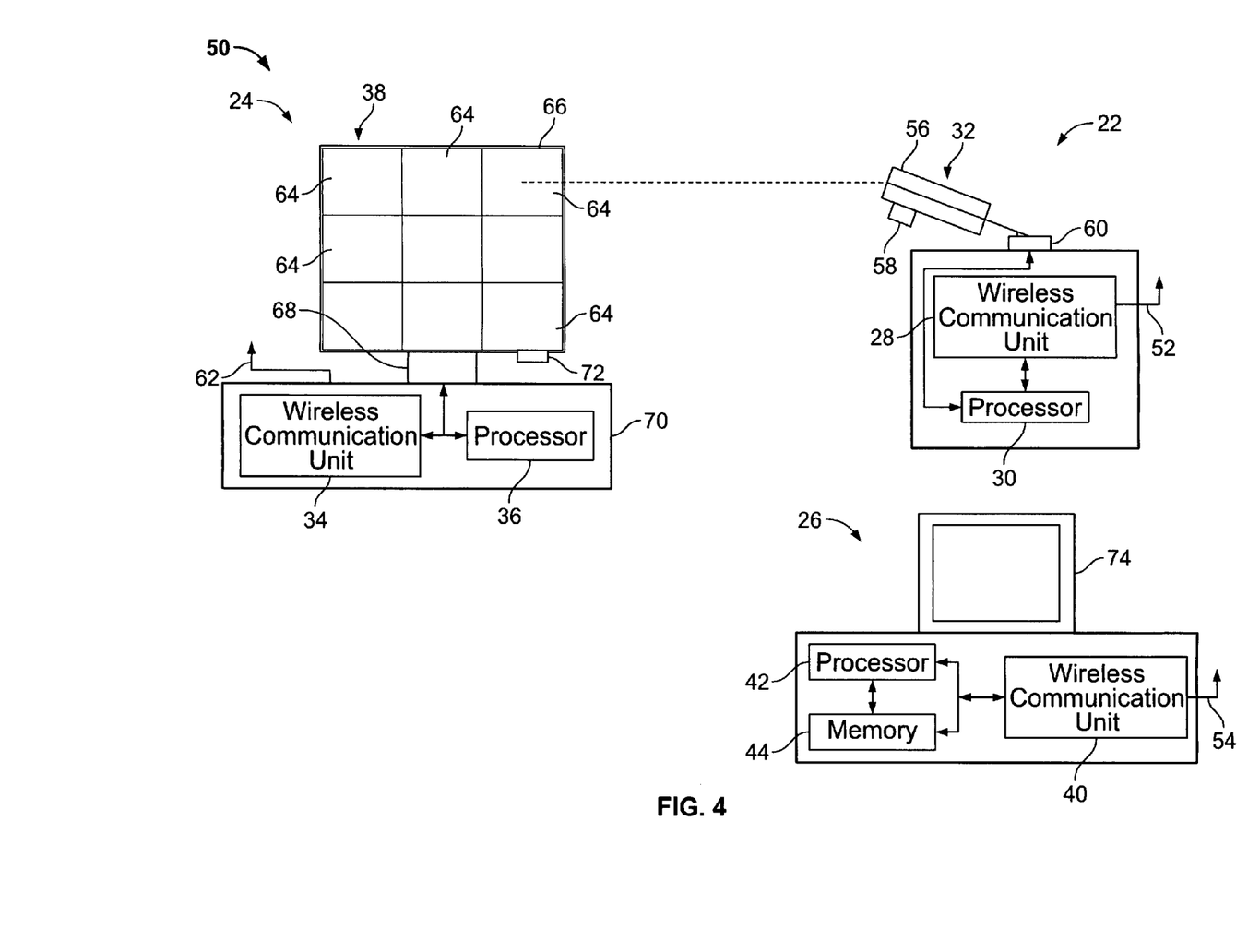
FIG. 4 is diagram of a navigation system for a local positioning system constructed in accordance with an embodiment of the invention

In one exemplary embodiment, a local positioning system 50 as shown in FIG. 4 is provided. The local positioning system 50 generally uses a polar coordinate system to guide the roving unit 24. In particular, the stationary unit 22 includes a wireless data link 52 that is configured to receive control commands from a wireless data link 54 of the controller 26. It should be noted that the wireless data links 52 and 54 may be provided as part of the wireless communication units 28 and 40, respectively. The stationary unit 22 includes a pointing device 32, which in this embodiment, includes a laser diode 56 (e.g., a Class 3A compliant laser diode as implemented currently) and an ultrasound emitting transducer 58. The pointing device 32 is mounted to a movable direction unit 60 implemented as a pan and tilt device moved by typical servo motors.

Figure 5:
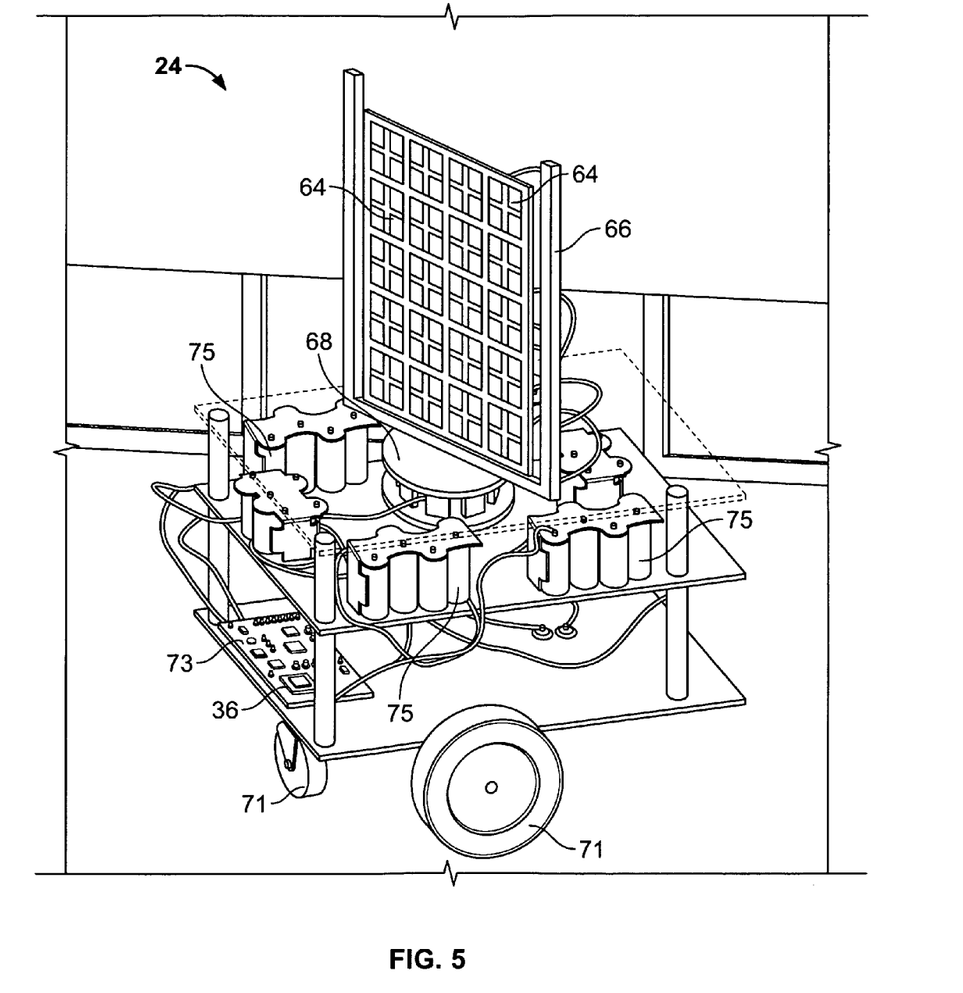
FIG. 5 is a perspective view of a roving unit constructed in accordance with an embodiment of the invention.

The roving unit 24 also includes a wireless data link 62 that may be provided as part of the wireless communication unit 34. The detector 38 includes a plurality of light detecting elements, for example, solar cells 64 that may be configured as a grid such as a three solar cell 64 by three solar cell 64 arrangement. For example, the plurality of solar cells 64 may be polycrystalline or monocrystalline solar cells mounted on a flat panel 66 that is provided on a movable unit 68. The movable unit 86 may include a rotating motorized device that rotates the panel three-hundred sixty degrees. The roving unit 24 also includes a mobile base 70 configured to move the roving unit 24 as described in more detail below (e.g., using motorized wheels). An ultrasound receiving transducer 72 is also attached to the flat panel 66. For example, as shown in FIG. 5, wheels 71 may be controlled and operated by electronics 73, including, for example, a motor, powered by one or more power sources 75 (e.g., battery packs). It should be noted that the wheels 71 may rotate or provided not only forward and reverse movement, but rotational movement.

The controller 26 may include a display 74 and user input (not shown), such as a keyboard, mouse, trackball, etc. The control of the roving unit 24 may be provided by the controller 26 using information (e.g., feedback) received from the roving unit 24 and a controlling the stationary unit 22 accordingly.

In operation, the stationary unit 22 receives wireless communication using the wireless via the wireless data link 52, which may include control commands from the controller 26 indicating the direction to point the pointing device 32. For example, the processor 30 of the stationary unit 22 receives control commands and processes the commands to direct the orientation of the guidance device. Essentially, the stationary unit 22 is the origin of a polar coordinate system used to navigate the roving unit 24 based on control commands from the controller 26. The pointing device 32, and more particularly, the laser diode 56 is modulated, for example, the processor 30, which may be a microcontroller or other processing or controller unit, pulses the laser diode 56 on and off at a predetermined frequency. For example, in one embodiment, the frequency is 400 hertz (Hz), but may be higher or lower as desired or needed. Further, upon receiving a "start" command from the controller 26 (communicated from the wireless data link 54 to the wireless data link 52), the processor 30 causes the ultrasound transducer 58 to emit bursts for predetermined periods of time. For example, in one embodiment, bursts of ten milliseconds (msec) are generated by the ultrasound transducer 58 and emitted every 20-100 msec. The interval between bursts may be determined, for example, based on a distance between the unit(s) and the controller.

Further, the emitted laser from the laser diode 56 (directed toward the roving unit 24) is detected by at least one of the solar cells 64. The size of the solar cells 64 essentially defines the accuracy or granularity of the navigation. Each of the solar cells 64 may be connected to a passive high pass filter that is then connected to an ultra low bandwidth high amplification state variable bandpass filter (both not shown). For example, the high pass filter may be a passive resistor capacitor (RC) circuit configured to provide high pass operation as is known. The high pass signal from the high pass filter is provided to the state variable bandpass active filter, which may be formed using one or more operational amplifiers as is known. The combination of filters is used to detect, for example, a laser hit on one of the solar cells 64. For example, the processor 36 converts the analog voltage generated by the solar cell 64 (that detected the emitted laser) to a digital signal. This conversion may be performed using an analog to digital converter configured in any known manner. By using the filters, the signal is then converted to a digitized voltage signal from an incoming essentially well recognized pseudo almost like sinusoidal signal and analyzed by a processor (e.g., a microcontroller or the processor 36 or 42) to determine whether, for example, a laser hit is detected. For example, the system may determine that when a sinusoid signal of about 400 Hz is detected, this detection is an indication that a laser hit has been detected.

The processor 36 or 42 then may access a database or table storing the locations of the solar cells 64 to determine which of the solar cells 64 detected the modulated laser signal. For example, a microcontroller may be provided with each of a plurality of A/D pins corresponding to the output of one of the solar cells 64. Once the microcontroller identifies which of the cells 64, for example, which of nine solar cells 64 detected the modulated laser signal, the information is provided via the corresponding A/D pin, and is transmitted via the wireless data link 62 to the wireless data link 54 of the controller 26.

At or near the same time that the solar cell 64 is identified by the microcontroller, and as a result of the "start" command being received by the roving unit 24 from the controller 26, a timer or counter is started. The ultrasonic "time of flight" from the stationary unit 22 (which started emitting ultrasound pulses upon receiving the same "start" command) to the roving unit 26 is measured by the microcontroller in any known manner using the timer or counter. The "time of flight" information is communicated from the wireless data link 62 of the roving unit 24 to the wireless data link 54 of the controller 26. Because updates to the polar position from the stationary unit 22 occur at a minimum of about 10 Hz (higher rates translate to the roving unit 24 having an increased velocity, but the roving unit 24 must be closer in distance to the stationary unit 22 as compared to slower rates with a slower roving unit that can be at a greater distance from the stationary unit 22) the panel 66 of solar cells 64 and the ultrasound transducer 72 on the panel 66 is rotated to continuously point at the stationary unit 22. More particularly, the controller determines the location, including the (i) angle and (ii) distance of the roving unit 24 from the stationary unit 22, based on the (i) detected modulated laser signal transmitted from the stationary unit 22 and received by the roving unit 24 and (ii) the "time of flight" information, respectively as received from the roving unit 24. Based on this received feedback information and a predetermined path of travel for the roving unit 24, the controller 26 transmits control commands to the stationary unit 22 to control the pan and tilt of the pointing device 32. Accordingly, the pointing device 32 of the stationary unit 30 remains continuously pointed at the panel 66 of solar cells 64. Thus, the pointing device 32 may navigate the roving unit 24 along a predetermined path or within a predetermined area (e.g., within the area of a yard).

It should be noted that the "start" command is communicated to the stationary unit 22 and the roving unit 24 from the controller 26 at the same time. Upon receiving the "start" command, the stationary unit 22 begins emitting ultrasound bursts as described above and the roving unit 24 starts a counter or timer as described in more detail above. It should be noted that the solar cells 64 also may be used to collect energy to provide power to the roving unit 24. For example, when the units are in a dormant or deactivate state, the solar cells 64 may be used to collect energy to reenergize the one or more power sources 75.

Figure 6:
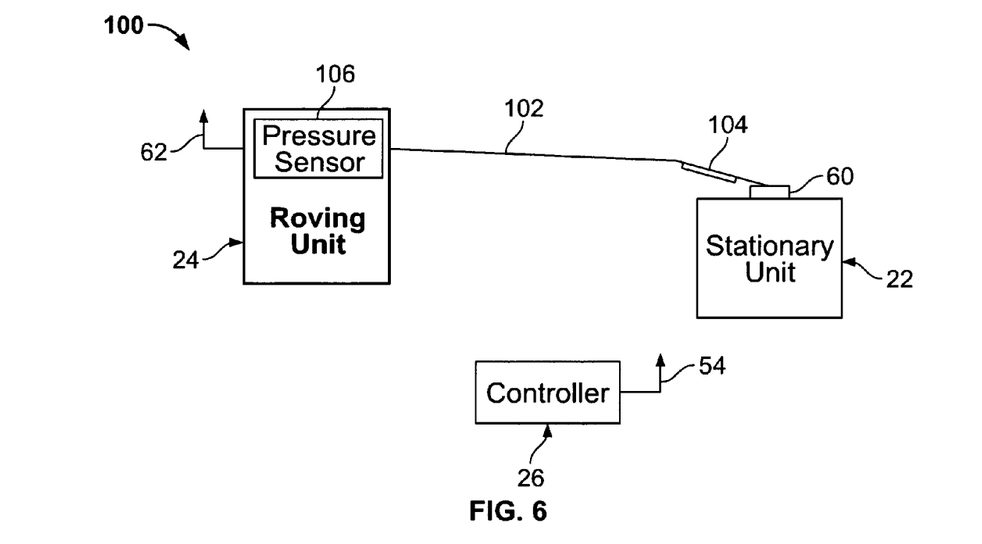
FIG. 6 is a block diagram of a navigation system for a local positioning system constructed in accordance with another embodiment of the invention.

In another embodiment, as shown in FIG. 6, a local positioning system 100 using polar coordinates may be implemented using a physical connector 102, for example, a string, connecting the roving unit 24 to the stationary unit 22. It should be noted that like numeral represent like parts. In this embodiment, the physical connector 102, and more particularly, the string, is a flexible string doped with magnetic material and the pointing device 32, and specifically, the movable direction unit 60, such as, the pan and tilt device includes one or more hall effect magnetic sensors 104 surrounding one end of the string. Further, the roving unit 24 includes a pressure sensor 106, for example, a pressure transducer, connected to the other end of the string. The motor in the roving unit 24 may be a rapid response motor. The string may be of a predetermined length, for example, twenty meters with the Hall Effect magnetic sensors 104 providing angle feedback information to the controller 26 and the string providing distance information. For example, the string may be on a coiled element (e.g., motorized unit such as a stepper motor) that winds and unwinds with the distance determined by the steps the motor takes to wind and unwind the string. The unit that shortens and lengthens the string may be located on the stationary unit 22 or the roving unit 24. The navigation and movement of the roving unit 24 is provided as described above.

In one embodiment, the single unit may include a mode switch to select operation in either a stationary mode or a roving mode or the operation may be provided automatically based on whether the unit is stationary, for example, on a docking station, or moving. Navigation is again performed as described above. The multiple units are again controlled by one or more controllers 26, which may be a standard PC.

It should be noted that the navigation, for example, the determination of distance may be performed using different methods. For example, the time of flight may be determined based on the time of flight of light instead based on the ultrasound signal.

Other embodiments are also provided. For example, the two units may include a camera and a bright light source, such as a glowing ball of light (e.g., glowing yellow ball of light or luminescent light bulb). In this embodiment, navigation information is communicated as described herein and the control of the movement of the one or more units is provided by maintaining the image of the light source in the middle of the view of the camera. The focus of the camera may be used to correlate to distance to provide distance information, that is, to keep the perceived or imaged light source, the same radius or size within the imaging portion of the camera.

The various embodiments or components, for example, the local positioning system and components therein, may be implemented as part of one or more computer systems. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), analog or digital frequency filters, digital signal processors (DSPs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention can be practiced with modification within the spirit and scope of the claims.

What is claimed is:

1. A guidance system for ground borne vehicles comprising
   a stationary unit,
   the stationary unit including a pointing device supported on a pan and tilt mechanism,
   the pointing device including a laser selectively emitting a modulated light signal,
   the pointing device further including a range finding mechanism,
   a roving unit,
   the roving unit comprising a light detecting apparatus providing feedback information to a controller coupled to the roving unit,
   the feedback information indicating receipt of the modulated light signal by the light detecting apparatus,
   the controller coupled to the stationary unit,
   the controller controlling a pan and a tilt of the pan and tilt mechanism to direct the modulated light signal toward the light detecting apparatus,
   the range finding mechanism determining spacial separation of the roving unit from the stationary unit,
   the range finding mechanism communicating spacial separation data to the controller,
   the controller controlling movement of the roving unit to maintain the modulated light signal upon the light detecting apparatus.

2. The guidance system of claim 1 wherein
   the modulated signal is a predetermined pattern of laser pulses.

3. The guidance system of claim 1 wherein
the light detecting apparatus comprises an array of solar cells.

4. The guidance system of claim 1 wherein
the range finding mechanism comprises an ultrasound transducer supported on the pointing device,
the ultrasound transducer emitting bursts of ultrasound energy,
the roving unit comprising an ultrasound detector receiving the bursts of ultrasound energy.

5. The guidance system of claim 4 wherein
the controller issues a start command to the ultrasound transducer and to a timer,
the timer determines time of flight of the bursts of ultrasound energy.

6. The guidance system of claim 1 wherein
the range finding mechanism comprises a second laser supported on the stationary unit.

7. The guidance system of claim 1 wherein
the controller is programmed with a predetermined path for the roving unit,
the controller issues direction commands to the pan and tilt mechanism responsive to the predetermined path.

8. The guidance system of claim 1 wherein
the light detecting apparatus comprises an array of solar cells,
the solar cells selectively generate electricity from light sources in an environment of the roving unit,
the solar cells are coupled to electric storage.

9. The guidance system of claim 8 wherein
the light detecting apparatus is pivotable about a substantially vertical axis,
the light detecting apparatus is pivotable about a substantially horizontal axis,
the orientation of the light detecting apparatus is controlled by the controller.

10. The guidance system of claim 9 wherein
the modulated signal is a predetermined pattern of laser pulses,
the light detecting apparatus comprising an array of solar cells,
the range finding mechanism comprising an ultrasound transducer supported on the pointing device,
the ultrasound transducer emitting bursts of ultrasound energy,
the roving unit comprising an ultrasound detector receiving the bursts of ultrasound energy,
the controller providing a start command to the ultrasound transducer and to a timer,
the timer determining time of flight of the bursts of ultrasound energy,
the solar cells selectively generating electricity from light sources in an environment of the roving unit,
the solar cells coupled to electric storage,
the light detecting apparatus pivotable about a substantially vertical axis,
the light detecting apparatus pivotable about a substantially horizontal axis,
the orientation of the light detecting apparatus controlled by the controller.

11. A pattern repetition system for ground-borne mobile equipment comprising
first and second selectively movable units,
a first of the first and second selectively movable units stationary when a second of the selectively movable units is moving,
each of the first and second movable units including a pointing device,
the pointing device comprising a light emitting element capable of generating a modulated light signal in a direction determined by the pointing device,
each of the first moveable unit and the second movable unit further comprising a light detecting element,
the light detecting element detecting the modulated light signal when the modulated light signal strikes the light detecting element,
each light detecting element selectively pivotable about a vertical axis,
a controller coupled to the pointing device and to the light detecting element of each of the first and second selectively movable units,
the light detecting element of the second of the first and second selectively movable units providing detection information to the pointing device of the first of the first and second selectively movable units,
the pointing device of the first of the first and second selectively movable units responsive to the detection information of the light detecting element of the second of the first and second selectively movable units to direct the pointing device of the first of the first and second selectively movable units toward the light detecting element of the second of the first and second selectively movable units,
the light detecting element of the second of the first and second selectively movable units indicating successful aim of the pointing device of the first of the first and second selectively movable units when the modulated light signal is detected by the light detecting element,
the pointing device of the first of the first and second selectively movable units providing directional information to the controller,
a distance measuring element determining physical separation of the first and the second of the first and second selectively movable units,
the distance measuring element communicating separation information to the controller,
the controller providing guidance information to the second of the first and second selectively movable units.

12. The pattern repetition system of claim 11 wherein
at least one docking station selectively receives the first of the first and second selectively movable units.

13. The pattern repetition system of claim 12 wherein
the light emitting element is a laser emitting pulses at a predetermined frequency,
the light detecting element detecting the pulses of the laser.

14. The pattern repetition system of claim 12 wherein
the distance measuring element comprises an ultrasound transmitter transmitting periodic bursts of ultrasound energy and an ultrasound receiver receiving ultrasound energy bursts transmitted by the ultrasound transmitter,
the controller receiving ultrasound transmission information and calculating the time of flight of the bursts of ultrasonic energy.

15. The pattern repetition system of claim 12 wherein
each light detecting element is further selectively positionable about a horizontal axis.

16. The pattern repetition system of claim 12 wherein
the controller is programmed by recording of direction and separation information provided by the first and second selectively movable units while the second of the first and second selectively movable units is moved about a preferred path.

17. The pattern repetition system of claim 12 wherein
the distance measuring element comprises an ultrasound transmitter on a one of the first and second selectively movable units and an ultrasound receiver on an other of the first and second selectively movable units.

18. The pattern repetition system of claim 12 wherein
each of the first and second selectively movable units comprises an electric storage device,
the electric storage device coupled to the light detecting element,
the light detecting element including solar cells,
the light detecting element delivering electricity to the electric storage device.

19. The pattern repetition system of claim 12 wherein
at least one of the first and second selectively movable units comprises a lawn mower.

20. Lawn mowing system comprising
a stationary unit,
the stationary unit including a pointing device supported on a pan and tilt mechanism,
the pointing device including a laser selectively emitting a modulated light signal,
the pointing device further including a range finding mechanism,
a roving grass cutting device,
the roving grass cutting device comprising a light detecting apparatus,
the light detecting apparatus providing feedback information to a controller coupled to the roving unit,
the feedback information indicating receipt of the modulated light signal by the light detecting apparatus,
the controller coupled to the stationary unit,
the controller controlling a pan and a tilt of the pan and tilt mechanism to direct the modulated light signal toward the light detecting apparatus,
the range finding mechanism determining spacial separation of the roving grass cutting device from the stationary unit,
the range finding mechanism communicating spacial separation data to the controller,
the controller controlling movement of the roving grass cutting device to maintain the modulated light signal upon the light detecting apparatus.

21. A guidance system for ground borne vehicles comprising
a stationary unit,
a roving unit,
the stationary unit including a pointing device supported on a pan and tilt mechanism,
the pointing device including a laser selectively emitting a modulated light signal,
a range finding mechanism determining spacial separation of the roving unit from the stationary unit,
the roving unit including a light detecting apparatus,
a controller coupled to the stationary unit and the roving unit,
the light detecting apparatus providing feedback information to the controller,
the feedback information indicating receipt of the modulated light signal by the light detecting apparatus,
the controller controlling a pan and a tilt of the pan and tilt mechanism,
the range finding mechanism communicating spacial separation data to the controller,
the pan and tilt mechanism providing a pan angle to the controller,
the controller controlling the pan angle to direct the modulated light signal toward the light detecting apparatus,
the controller controlling movement of the roving unit and the light detecting apparatus to maintain the modulated light signal upon the light detecting apparatus.

22. The guidance system of claim 21 wherein
the range finding mechanism comprises an ultrasound transmitter transmitting periodic bursts of ultrasound energy and an ultrasound receiver receiving ultrasound energy bursts transmitted by the ultrasound transmitter,
the controller receiving ultrasound transmission information and calculating the time of flight of the bursts of ultrasonic energy.

23. The guidance system of claim 21 wherein
the pan and tilt mechanism provides a tilt angle to the controller,
the controller controlling the tilt angle to direct the modulated light signal toward the light detecting apparatus.

* * * * *